United States Patent
Bitterlich

(10) Patent No.: US 8,280,358 B2
(45) Date of Patent: Oct. 2, 2012

(54) METHOD FOR OPERATING AD HOC COMMUNICATION NETWORK AND CORRESPONDING DEVICE

(75) Inventor: Jean-Yves Bitterlich, München (DE)

(73) Assignee: Siemens Aktiengesellschaft, Munich (DE)

( * ) Notice: Subject to any disclaimer, the term of this patent is extended or adjusted under 35 U.S.C. 154(b) by 1271 days.

(21) Appl. No.: 11/664,127

(22) PCT Filed: Sep. 22, 2005

(86) PCT No.: PCT/EP2005/054741
§ 371 (c)(1), (2), (4) Date: Mar. 29, 2007

(87) PCT Pub. No.: WO2006/034986
PCT Pub. Date: Apr. 6, 2006

(65) Prior Publication Data
US 2007/0270134 A1   Nov. 22, 2007

(30) Foreign Application Priority Data
Sep. 29, 2004 (DE) .......................... 10 2004 047 370

(51) Int. Cl.
*H04L 29/08* (2006.01)
(52) U.S. Cl. .............. 455/414.2; 455/522; 455/453; 455/561; 455/411; 455/41.2; 370/487; 370/466; 370/537; 370/270; 370/338
(58) Field of Classification Search ........... 455/414.2, 455/410–411, 453, 41.1–41.2, 522, 561; 370/338, 270, 487, 466, 537
See application file for complete search history.

(56) References Cited

U.S. PATENT DOCUMENTS

| | | | |
|---|---|---|---|
| 7,024,204 B2 * | 4/2006 | Nakakita et al. ............... | 455/453 |
| 2001/0002912 A1 * | 6/2001 | Tony et al. .................... | 370/487 |
| 2003/0097419 A1 | 5/2003 | Pradhan et al. | |
| 2004/0003051 A1 | 1/2004 | Krzyzanowski et al. | |
| 2004/0087274 A1 * | 5/2004 | Ekberg et al. ................ | 455/41.2 |
| 2004/0098447 A1 | 5/2004 | Verbeke et al. | |
| 2004/0203354 A1 * | 10/2004 | Yue .............................. | 455/41.1 |
| 2005/0059379 A1 * | 3/2005 | Sovio et al. ................... | 455/411 |
| 2005/0059420 A1 * | 3/2005 | Salokannel et al. ......... | 455/522 |

(Continued)

FOREIGN PATENT DOCUMENTS

CN   1419394 A   5/2003

(Continued)

OTHER PUBLICATIONS

International Search Report for Application No. PCT/EP2005/054741; mailed Jan. 2, 2006.

(Continued)

*Primary Examiner* — Kiet Doan
*Assistant Examiner* — Michael T Vu
(74) *Attorney, Agent, or Firm* — Staas & Halsey LLP

(57) ABSTRACT

A user leaving an ad-hoc network is detected and a corresponding sequence of commands are executed independently of surrounding conditions. A user who joins the network transmits an execute-on-leave script to one or several users. The execute-on-leave script includes the commands that have to be executed when the user leaves the network, to ensure that the script is executed even when the device is no longer a network user.

11 Claims, 1 Drawing Sheet

U.S. PATENT DOCUMENTS

2005/0075084 A1 * 4/2005 Salokannel et al. .......... 455/126

FOREIGN PATENT DOCUMENTS

| DE | 101 31 839 A1 | 1/2003 |
|----|---------------|--------|
| EP | 1 102 500 A2 | 5/2001 |
| EP | 1 187 023 A1 | 3/2002 |
| EP | 1 435 743 A1 | 7/2004 |
| WO | 03/026211 A1 | 3/2003 |

OTHER PUBLICATIONS

Communication from German Patent Office for German Application No. 10 2004 047 370.6; dated Sep. 21, 2005.

* cited by examiner

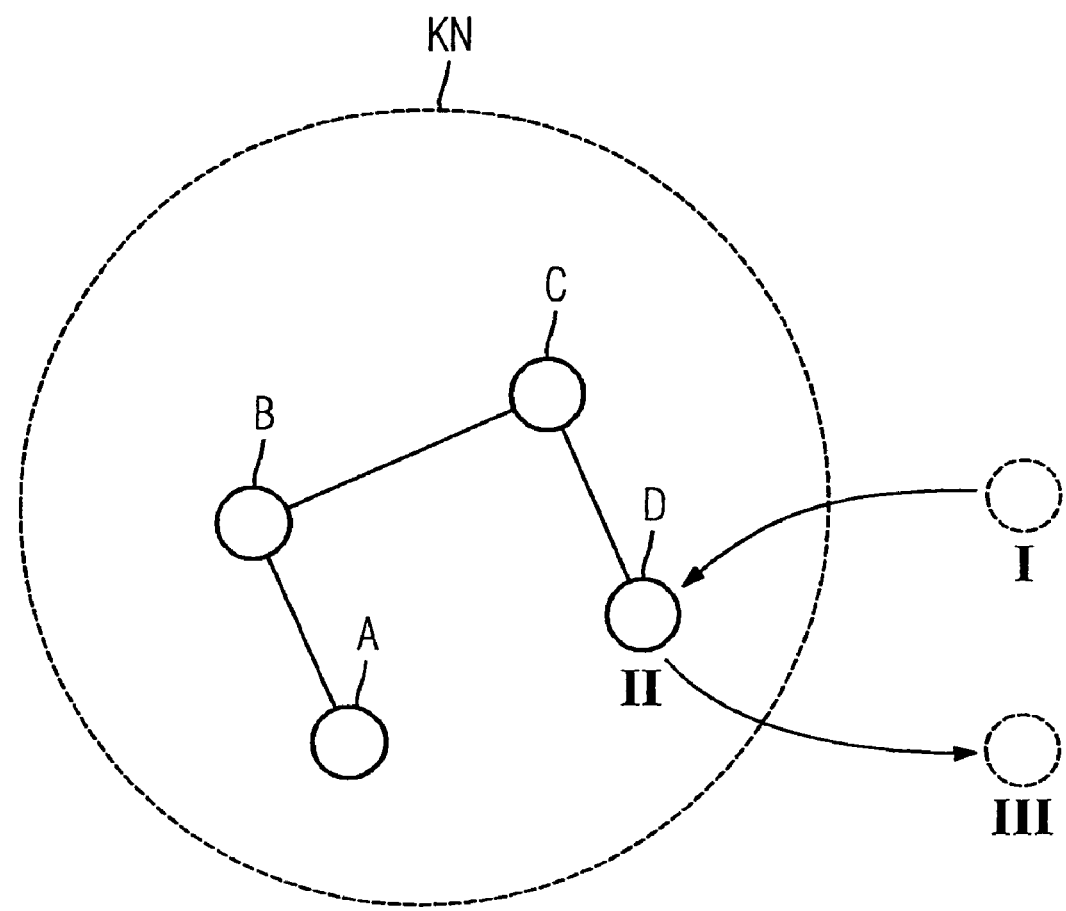

METHOD FOR OPERATING AD HOC COMMUNICATION NETWORK AND CORRESPONDING DEVICE

CROSS REFERENCE TO RELATED APPLICATIONS

This application is based on and hereby claims priority to German Application No. 10 2004 047 370.6 filed on Sep. 29, 2004, the contents of which are hereby incorporated by reference.

BACKGROUND

Described below a method for operating an ad hoc communication network having a plurality of subscribers, the subscribers being able to engage in spontaneous communication with one another, by execution of one or more leave commands when one subscriber of the plurality of subscribers leaves the ad hoc communication network. Also described is a corresponding communication device for setting up an ad hoc communication network with other subscribers.

Some ad hoc communication networks (or ad hoc networks for short) are based on the rule that a subscriber must notify the other subscribers upon leaving the network. Usually, however, the problem is that the subscriber (or, as the case may be, the device) does not know in advance at what moment in time he (or, as the case may be, it) will leave the network. Often the subscriber does not know that he/it will leave the network until after he/it has already left the network. By that time, however, it is no longer possible for the subscriber to transmit a "Goodbye" message or corresponding control commands to the network or, as the case may be, its subscribers.

One approach to a solution of this problem would be to measure the performance, the connection quality and other parameters of the network and to determine when the connection could break off. However, this solution is not reliable, since the network's performance and connection quality are heavily dependent on the environment. What are termed "ad hoc networks", by which spontaneous communication is possible, are namely configured in such a way that they reorganize themselves dynamically in time and space. Consequently the environment changes constantly, which means that a solution in this regard would not be efficient.

SUMMARY

It is therefore desired to provide a device and a method by which the setting up of ad hoc communication networks can be organized with less difficulty.

Described below in more detail is a method for operating an ad hoc communication network having a plurality of subscribers, the subscribers being able to engage in spontaneous communication with one another, by execution of one or more leave commands when a first subscriber of the plurality of subscribers leaves the ad hoc communication network, and transmission of the leave command or the plurality of leave commands or a subset thereof by the first subscriber, when the latter joins the ad hoc communication network, to at least a second of the plurality of subscribers that is already integrated in the ad hoc communication network, the at least one second subscriber executing the leave command or the plurality of leave commands or a subset thereof when the first subscriber leaves the ad hoc communication network.

Also provided is a communication device for setting up an ad hoc communication network with other subscribers, the transmission device automatically setting up a communication to at least one of the other subscribers of the ad hoc communication network and a memory device for storing one or more leave commands which are to be executed by the other subscribers if the communication device, as a subscriber, leaves the ad hoc communication network, the leave command or the plurality of leave commands or a subset thereof being able to be transmitted automatically by the transmission device to the at least one of the other subscribers for execution when the communication device joins the ad hoc communication network as a subscriber.

The possibility is thus created that certain commands relating to the leaving subscriber are still executed in the network even if the subscriber has already left the network.

Preferably the leave command(s) is (are) combined in a leave script according to a predetermined standard. This allows the commands that are to be executed to be easily transmitted and processed.

The leave script can be sent to a plurality of subscribers, thereby increasing the probability that there is still present in the network at least one subscriber that has stored the leave script if the subscriber from which the leave script originates has left the network.

The leave script can also be sent in different parts to different subscribers. This enables the processing of the leave script to be distributed efficiently to correspondingly suitable subscribers. In addition it also increases the probability that at least parts of the leave script are processed if further subscribers leave the network.

The leave commands are favorably processed when it has been established by the transmission device that a subscriber has left the ad hoc network. This can happen for example as a result of the transmission device's registering that no further communication can be set up with the one subscriber.

BRIEF DESCRIPTION OF THE DRAWINGS

These and other objects and advantages will become more apparent and more readily appreciated from the following description of an exemplary embodiment, taken in conjunction with the accompanying drawing of FIG. 1, which symbolically depicts a subscriber entering and leaving an ad hoc network.

DETAILED DESCRIPTION OF THE PREFERRED EMBODIMENT

Reference will now be made in detail to a preferred embodiment, an example of which is illustrated in the accompanying drawing of FIG. 1, wherein like reference numerals refer to like elements throughout.

According to the drawing of FIG. 1, an ad hoc communication network KN initially consists of the three subscribers A, B and C. These communicate with one another either directly or via multi-hopping. It is important for the routing to know which subscribers are present in the communication network KN.

If a new subscriber D now joins the communication network KN, this happens by the subscriber's initiating communication with one of the subscribers of the ad hoc network KN. According to FIG. 1, subscriber D in this case switches from state I to state II. In the process he/it stores what is referred to as an execute-on-leave script on one or more target devices which are already present as subscribers in the network KN. This script is executed as soon as subscriber D leaves the network KN and in the process switches to state III. The fact whether subscriber D has left the network KN can be established for example in that none of the subscribers still present in the network can reach subscriber D. This can be established after a single attempt or after a plurality of attempts, with a delay where applicable.

A typical scenario is explained below with reference to the accompanying FIG. 1 as a concrete example, as already indicated above. The devices or, as the case may be, subscribers A, B and C are already present in the ad hoc network KN. All of them provide different services. Subscriber D now joins the network and learns that subscriber C provides an interesting service that subscriber D would possibly like to use. Subscriber C possesses overhead projector functionality, for example.

Furthermore, subscriber D receives information via a multi-hopping connection to the effect that subscriber B offers service loudspeaker functionality.

Subscriber D now establishes a connection to subscriber C and sends the latter the instruction: "The slides are no longer to be shown if subscriber D leaves the network KN". Alternatively or in addition, subscriber D can send subscriber A the instruction: "From now on show a particular slide show".

Subscriber D thereupon establishes a connection to subscriber B and sends the latter the instruction: "When subscriber D leaves the network KN, the loudspeakers should be switched off". Alternatively subscriber D can also send, directly or indirectly, the instruction "send a particular piece of music!" to subscriber B.

If necessary, an execute-on-leave script can also be sent to subscriber A for the latter to execute when subscriber D leaves the network KN.

In the current configuration only subscriber C has a direct connection to subscriber D. If subscriber D now leaves the network KN by switching from state II to state III, subscriber C can establish this fact because he/it no longer has a connection to subscriber D. Subscriber C thereupon starts his/its execute-on-leave script and no longer shows the slides. Subscriber B also ascertains through the mediation of subscriber C or learns from subscriber C by a corresponding message that subscriber D has left the network KN. Subscriber B thereupon interrupts the playing of music.

The principle of storing an execute-on-leave script with a subscriber of the network when a new subscriber enters the network and of executing the script when the subscriber leaves the network is generic and can be used for any scenarios. For example, components of a vehicle including a transponder which the driver carries on his or her person can form an ad hoc network. If the driver now leaves the vehicle with the transponder, the vehicle can be automatically locked, the radio switched off and further functions executed. Simple routing can also be implemented accordingly. Moreover the principle provides a reliable solution for execution of commands after a subscriber leaves a communication network, irrespective of the particular environment. Furthermore the principle is based on what is referred to as ad hoc middleware, which every communication device usually possesses in any case.

A description has been provided with particular reference to a preferred embodiment thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for operating an ad hoc communication network having multiple subscriber devices, the subscriber devices able to engage in spontaneous communication with one another, comprising:
   transmitting, upon a first subscriber device joining the ad hoc communication network, at least one leave command from the first subscriber to at least one second subscriber device that is already included in the ad hoc communication network; and
   executing, at the at least one second subscriber device, the at least one leave command or a subset thereof, when the first subscriber leaves the ad hoc communication network.

2. The method as claimed in claim 1, wherein the at least one leave command is in a leave script.

3. The method as claimed in claim 2, wherein the leave script is sent to a plurality of the subscriber devices.

4. The method as claimed in claim 3, wherein different parts of the leave script are sent to different subscribers.

5. The method as claimed in claim 4, further comprising detecting departure of the first subscriber device from the ad hoc network when no further communication can be set up to the first subscriber device.

6. A communication device for setting up an ad hoc communication network with other subscribers, comprising:
   a transmission device automatically setting up communication with at least one of the other subscribers of the ad hoc communication network; and
   a memory device storing at least one leave command which is to be executed by the at least one of the other subscribers when said communication device leaves the ad hoc communication network, said transmission device automatically transmitting the at least one leave command or a subset thereof to the at least one of the other subscribers for execution when the communication device joins the ad hoc communication network as a subscriber.

7. The communication device as claimed in claim 6, further comprising a processing device processing at least one other leave command received from another subscriber that has left the ad hoc network in response to an indication from said transmission device indicating that departure of the other subscriber from the ad hoc network has been established.

8. The communication device as claimed in claim 7, wherein said memory device stores the at least one leave command in a leave script.

9. The communication device as claimed in claim 8, wherein said transmission device sends the leave script to a plurality of the other subscribers.

10. The communication device as claimed in claim 9, wherein said transmission device sends different parts of the leave script to different subscribers.

11. The communication device as claimed in claim 10, wherein said transmission device establishes departure of the other subscriber from the ad hoc network when no further communication can be set up to the other subscriber.

* * * * *